US008170774B2

(12) United States Patent
Forte et al.

(10) Patent No.: US 8,170,774 B2
(45) Date of Patent: May 1, 2012

(54) METHOD AND DEVICES FOR THE CONTROL OF THE AIR-FUEL RATIO OF AN INTERNAL COMBUSTION ENGINE

(75) Inventors: Pasquale Forte, Orsenigo (IT); Stefano Bordegnoni, Orsenigo (IT); Andrea Gelmetti, Orsenigo (IT)

(73) Assignee: Eldor Corporation S.p.A., Orsenigo (IT)

( * ) Notice: Subject to any disclaimer, the term of this patent is extended or adjusted under 35 U.S.C. 154(b) by 687 days.

(21) Appl. No.: 12/282,955

(22) PCT Filed: Feb. 7, 2007

(86) PCT No.: PCT/EP2007/001021

§ 371 (c)(1), (2), (4) Date: Apr. 1, 2009

(87) PCT Pub. No.: WO2007/112803

PCT Pub. Date: Oct. 11, 2007

(65) Prior Publication Data

US 2009/0326786 A1 Dec. 31, 2009

(30) Foreign Application Priority Data

Mar. 30, 2006 (IT) .............................. MI2006A0599

(51) Int. Cl.
*G06F 19/00* (2011.01)
*F02D 41/14* (2006.01)

(52) U.S. Cl. ........ 701/104; 701/109; 701/111; 123/435; 123/673; 123/694

(58) Field of Classification Search ............. 123/406.26, 123/406.29, 406.3, 435, 436, 478–480, 672, 123/673, 694–696; 701/101–105, 109, 111, 701/114, 115; 73/35.01–35.06, 114.52, 114.53, 73/114.71, 114.72; 702/182, 183, 185
See application file for complete search history.

(56) References Cited

U.S. PATENT DOCUMENTS

| | | | | |
|---|---|---|---|---|
| 4,962,741 | A * | 10/1990 | Cook et al. | 123/673 |
| 5,769,049 | A * | 6/1998 | Nytomt et al. | 123/435 |
| 5,811,670 | A * | 9/1998 | Nolte et al. | 73/114.72 |
| 6,029,627 | A * | 2/2000 | VanDyne | 123/435 |
| 6,505,500 | B1 * | 1/2003 | Elgh et al. | 73/35.08 |
| 6,820,418 | B2 * | 11/2004 | Nakatani et al. | 60/285 |
| 7,925,420 | B2 * | 4/2011 | Forte et al. | 701/104 |
| 2004/0084026 | A1 | 5/2004 | Zhu et al. | |
| 2010/0070157 | A1 * | 3/2010 | Forte et al. | 701/104 |

FOREIGN PATENT DOCUMENTS

| | | | | |
|---|---|---|---|---|
| DE | 198 01 815 | A1 | 7/1999 | |
| DE | 103 51 133 | A1 | 5/2004 | |
| JP | 07229443 | A * | 8/1995 | 701/103 |
| JP | 07310573 | A * | 11/1995 | 701/111 |
| WO | WO 98/37322 | A1 | 8/1998 | |
| WO | WO 99/36689 | A1 | 7/1999 | |
| WO | WO 00/61932 | A1 | 10/2000 | |

* cited by examiner

*Primary Examiner* — Willis Wolfe, Jr.
(74) *Attorney, Agent, or Firm* — Greer, Burns & Crain, Ltd.

(57) ABSTRACT

Methods and devices for controlling the normalized air-fuel ratio of an internal combustion engine, otherwise known, in technical terms, as Lambda. The present invention is based on the use of the ionization current released by a device positioned on each cylinder of the engine. This ionization current is measured by a Control Unit equipped with a low-pass filter and electronic means which implement the invention.

2 Claims, 4 Drawing Sheets

[Fig.2]
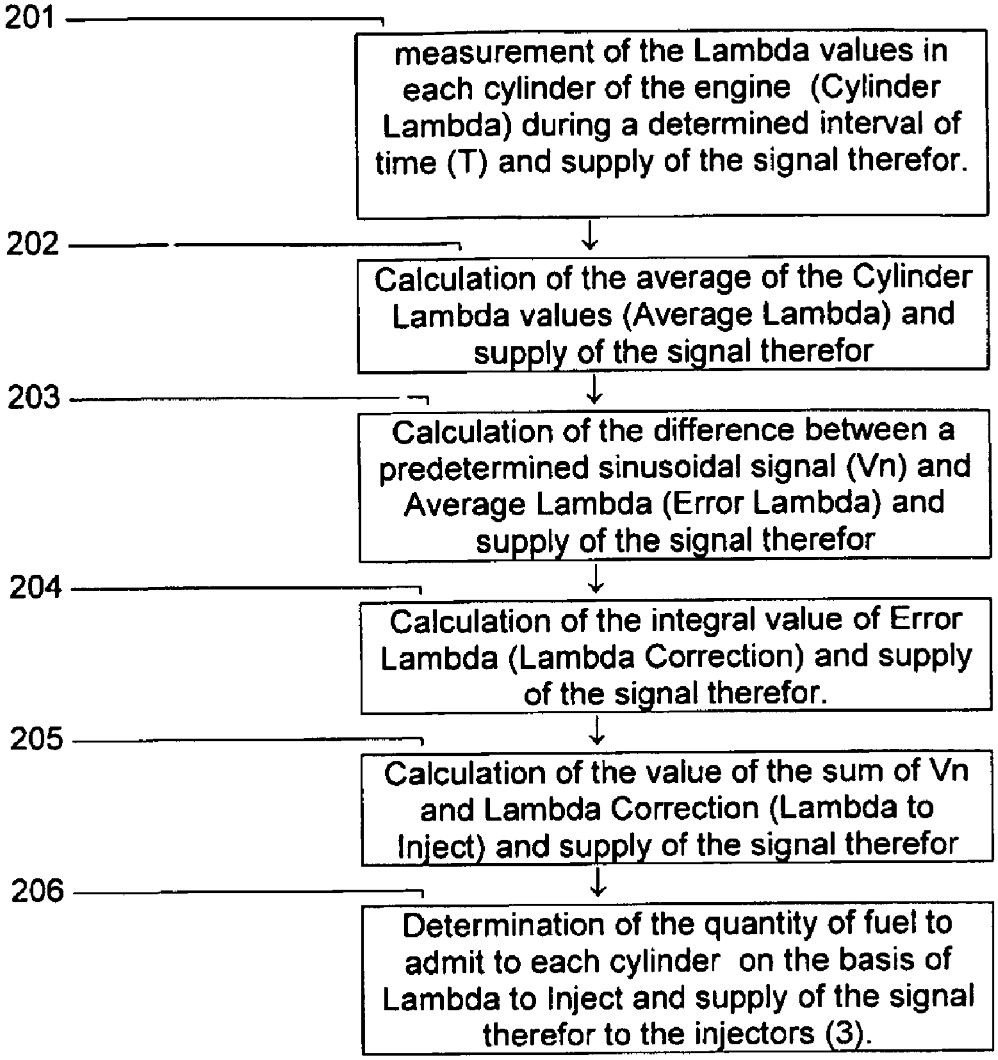

[Fig.3]
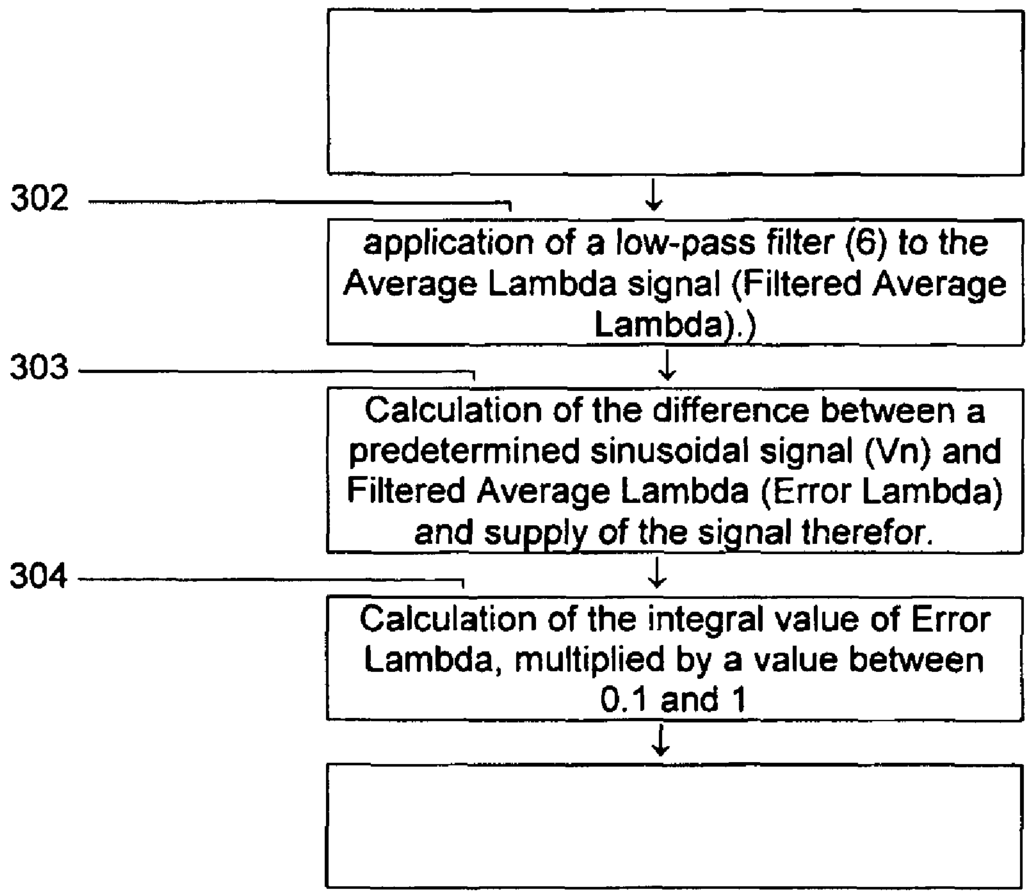

[Fig.4]
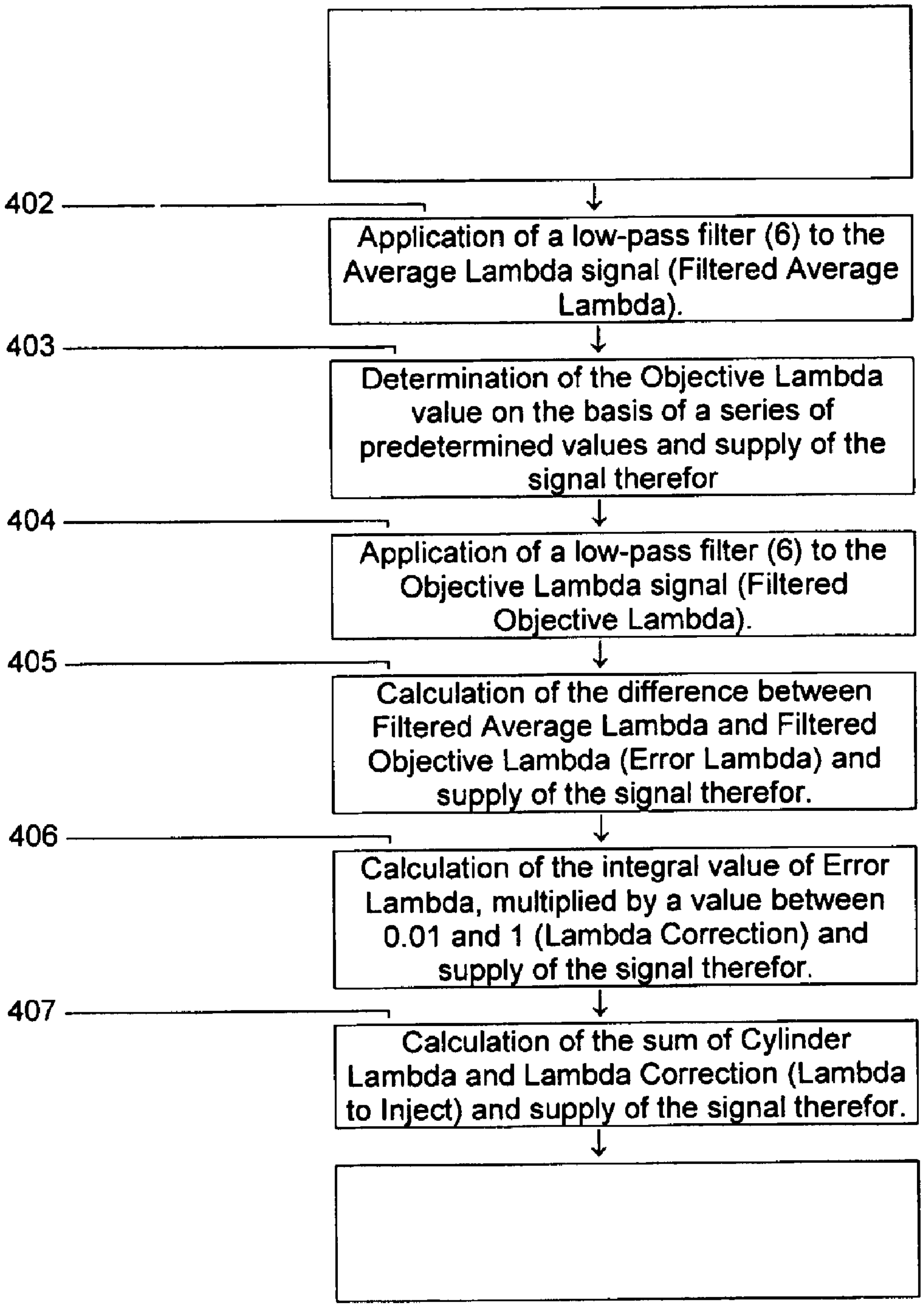

METHOD AND DEVICES FOR THE CONTROL OF THE AIR-FUEL RATIO OF AN INTERNAL COMBUSTION ENGINE

This application is a U.S. National Phase under 35 U.S.C. §371 of International Application No. PCT/EP2007/001021, filed Feb. 7, 2007, which claims priority to Italian Patent Application No. MI2006A000599, filed Mar. 30, 2006, which is hereby incorporated by reference in its entirety.

TECHNICAL FIELD

The present invention relates to a method and devices therefor for controlling the normalized air-fuel ratio of an internal combustion engine, otherwise known, in technical terms, as Lambda.

BACKGROUND ART

In order to maximized the efficiency of catalytic converters in internal combustion engines, it is necessary to maintain the concentration of exhaust gases from said internal combustion engines in proximity to a preset value, which varies according to the type and the manufacturer of the various engines. It is known that maintaining said concentration of the gases in proximity to a desired value can be obtained by adopting a lambda control system.

The devices and methods currently utilized and available on the market for controlling the air-fuel ratio in an internal combustion engine are based on the use of sensors that produce a signal depending on the type of exhaust gas produced by the engine: rich or lean. Depending on the type of exhaust gas produced, the air-fuel ratio is modified in order to reach the air-fuel ratio established to maintain the concentration of the exhaust gases in proximity to a desired value.

This known method presents various drawbacks. The most relevant drawbacks are constituted of the possibility of the sensors failing to function and the imprecision of the measurements taken, which are based on the type of exhaust gases: rich or lean.

DISCLOSURE OF INVENTION

The aim of the present invention is to identify a method and devices therefor for controlling the air-fuel ratio of an internal combustion engine accurately and reliably, avoiding the use of sensors and effecting said control on each cylinder of said engine.

The present invention makes advantageous use of the ionization current developed during the combustion of the fuel in each cylinder of said engine, the number of ions in said ionization current being closely correlated with the air-fuel mix ratio in each cylinder of an internal combustion engine.

The present invention is based on the use of the ionization current released by a device, positioned on each cylinder of said engine. This ionization current is measured by a Control Unit, commonly utilized for the management of said combustion engines. Said Control Unit is equipped with a low-pass filter and electronic means which implement the method of the present invention. The aims and advantages of the present invention will better emerge in the description that follows which is made purely in the form of non-limiting examples in the plates enclosed, which refer to an internal combustion engine with a plurality of cylinders:

FIG. 2 illustrates, schematically, the flow chart relating to the method according to the invention in question;

FIGS. 3 and 4 illustrate further flow charts according to embodiments relating to the method of the invention in question.

Figure 1:
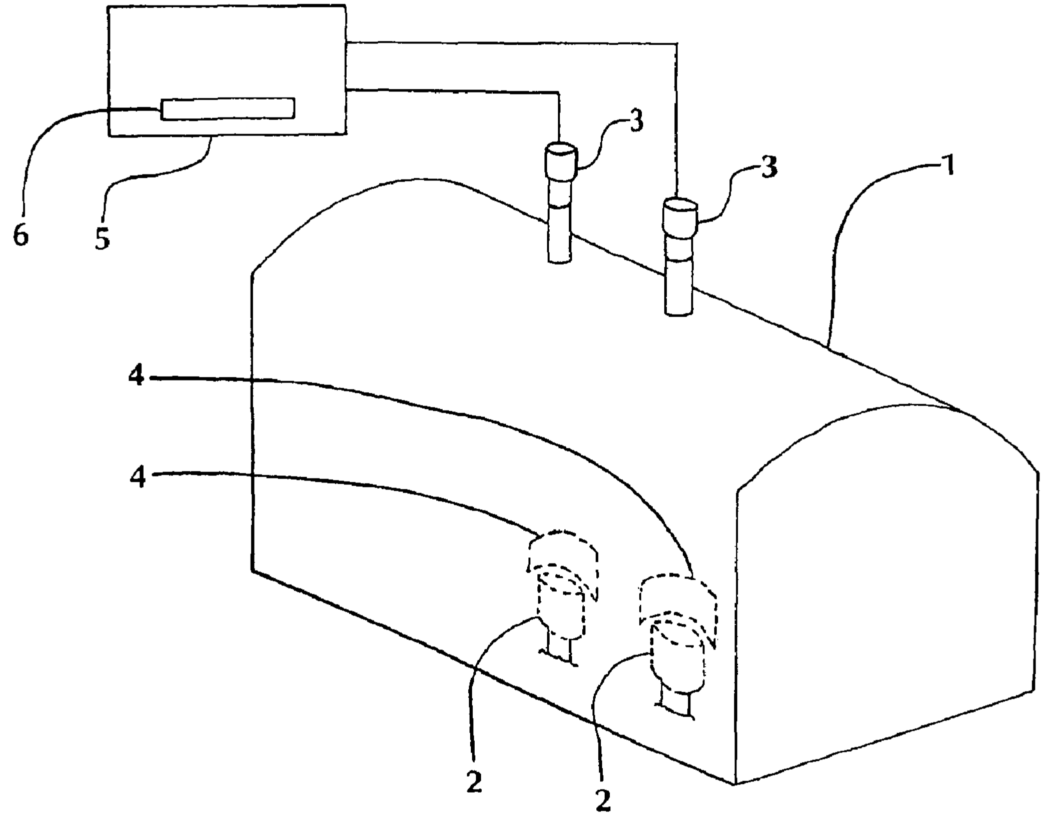
FIG. 1 illustrates a schematic view of the engine which utilises the method and the Control Unit in which the means that implement the invention in question are housed.

With reference to FIG. 1, (1) indicates an internal combustion engine as a whole, devices (4) are shown, positioned above each cylinder, which in addition to creating the spark, by means of the spark plug, necessary to realise the combustion inside the engine, release the ionization current, which is indispensable to implement the method in question, injectors (3) provide for the injection of fuel into the cylinders (2). This figure also shows a Control Unit (5) fitted with a low-pass filter (6). Also positioned in said Control Unit are the devices (not shown in the figure) to implement the method.

With reference to FIG. 2, said figure indicates a flow chart which schematically illustrates the method in question in the invention. This method develops over various phases, each of which corresponds to the relative electronic device, identified with the same reference number as the respective phase of the method. In a first phase (201), the measurement of the signal for the normalized air-fuel ratio values, referred to by field technicians as 'Lambda', is taken in each cylinder (2) of the internal combustion engine (1) during a determined period of time (T) and the signal relating to the values measured is supplied to the Control Unit (5). The values measured in said period of time (T) are referred to, in the present invention, with the term 'Cylinder Lambda'. The method proceeds with a subsequent phase (202) envisaging the calculation of the average of the Cylinder Lambda values measured during the previous phase and the supply of the signal therefor, preferably, to a portion of the Control Unit dedicated to checking the Lambda values. The values calculated in said phase are referred to in the present invention with the term 'Average Lambda'.

The subsequent phase (203) of the method relates to the determination of a value referred to in the present invention as Error Lambda, which is the difference between a predetermined sinusoidal signal (Vn), known by field technicians as the optimization operator for the performance of the catalytic converter, and the Average Lambda, as mentioned in the previous phase (202). The previous phase also envisages the supply of the signal representing Error Lambda. This signal is supplied, preferably, to a portion of the Control Unit (5) dedicated to checking the Lambda values.

The subsequent phase (204) of the method relates to the determination of a value, referred to in the present invention as Lambda Correction, by means of the calculation of the integral, of Error Lambda, as mentioned in the previous phase (203). The phase also envisages the supply of the signal representing Lambda Correction. This signal is supplied, preferably, to a portion of the Control Unit (5) dedicated to governing the checks on the Lambda values.

The method proceeds with the phase (205) which envisages the calculation of the value of the sum of said predetermined sinusoidal signal (Vn) and Lambda Correction. Said predetermined value is known by field technicians for the optimisation of the performance of the catalytic converters. The value of said sum is referred to in the present invention as Lambda to Inject. The phase also envisages the supply of the signal representing Lambda to Inject. This signal is supplied, preferably, to a portion of the Control Unit (5) dedicated to checking the Lambda values.

The method concludes with phase 206. Said phase envisages the determination, preferably by means of the Control Unit (5), of the quantity of fuel in each cylinder (2) of said engine (1) on the basis of the Lambda to Inject value, determined during the previous phase (205), with the sending of the signal therefor to the injectors (3).

FIG. 3 illustrates a second embodiment of the invention. This shows a flow chart which illustrates, schematically, the method in question in the invention. This method develops over various phases, each of which corresponds to the relative electronic device, identified with the same reference number as the respective phase of the method. Said embodiment substitutes phases 203 and 204 of the method in question in the invention shown in FIG. 2 with the following phases.

Phase 302 relates to the application of a low-pass filter (6) to the signal representing the Average Lambda values calculated in the previous phase of the method. The signal obtained following the application of said low-pass filter is referred to in the present invention as Filtered Average Lambda.

The subsequent phases of the method according to the present embodiment (303) relates to the calculation of the difference between said predetermined sinusoidal signal (Vn) and Filtered Average Lambda, as per the previous phase (302). This predetermined value is known by field technicians for the optimization of the performance of the catalytic converter. The value determined in the present phase is referred to as Error Lambda. The phase also envisages the supply of the signal representing Error Lambda, preferably, to a portion of the Control Unit (5) dedicated to checking the Lambda values. The subsequent phase (304) of the method relates to the determination of a value referred to in the present invention as Lambda Correction, by means of the calculation of the Error Lambda integral, multiplied by a value between 0.1 and 1. The phase also envisages the supply of the signal representing Lambda Correction, preferably, to a portion of the Control Unit (5) dedicated to checking the Lambda values.

The method continues and concludes with phases 205 and 206, described in relation to FIG. 2.

FIG. 4 illustrates a different embodiment of the invention. It shows a flow chart which illustrates, schematically, the method in question in the invention. This method develops over various phases, each of which corresponds to the relative electronic device, identified with the same reference number as the respective phase of the method. Said embodiment substitutes phases 203, 204 and 205 of the method in question in the invention shown in FIG. 2 with the following phases. Phase 402 relates to the application of a low-pass filter (6) to the signal representing the Average Lambda values calculated in the previous phase of the method. The signal obtained following the application of said low-pass filter is referred to in the present invention as Filtered Average Lambda.

The subsequent phase (403) relates to the determination of the objective lambda value, known by field technicians, on the basis of a comparison with the predetermined values, also known by field technicians. The phase also envisages the supply of the signal representing the objective lambda determined in said phase, which is referred to in the present invention as Objective Lambda. Said signal is supplied, preferably, to a portion of the Control Unit (5) dedicated to checking the Lambda values.

The subsequent phase 404 relates to the application of a low-pass filter (6) to the signal representing Objective Lambda. In the present invention, the signal obtained after the application of the low-pass filter (6) is called Filtered Objective Lambda.

The subsequent phase of the method according to the present embodiment (405) relates to the calculation of the difference between Filtered Average Lambda and Filtered Objective Lambda. The value determined in this phase is called Error Lambda. This phase also envisages the supply of the signal representing Error Lambda, preferably to a portion of the Control Unit (5) which is dedicated to the check of lambda values.

The subsequent phase (406) of the method relates to the determination of a value, referred to in the present invention as Lambda Correction, by means of the calculation of the Error Lambda integral, multiplied by a value between 0.01 and 1. The phase also envisages the supply of the signal representing Lambda Correction, preferably, to a portion of the Control Unit (5) dedicated to checking the Lambda values.

The method continues with another phase (407) which envisages the determination of the ratio of the air-fuel to be injected into the cylinders (2) of said engine (1), referred to as Lambda to Inject, on the basis of the calculation of the sum of Objective Lambda and Lambda Correction. The phase also envisages the supply of the signal representing the value Lambda to Inject, preferably, to a portion of the Control Unit (5) dedicated to checking the lambda values.

The method continues and concludes with phase 206, described in relation to FIG. 2.

The description above and the plates enclosed illustrate embodiments of the present invention, are provided purely in the form of non-limiting examples within the scope of protection as per the following claims.

The invention claimed is:

1. A method for determining and putting in a quantity of fuel, on the basis of predetermined sinusoidal target signal of Lambda into an internal combustion engine equipped with a plurality of cylinders, injectors, an ionization current generating device for each cylinder and a control unit suitable to determine the Lambda value in each cylinder using the ionization current, wherein said method comprises:

measurement of the Lambda values in each cylinder of said engine during an interval of time (T) (Cylinder Lambda) and supply of the signal therefore to the control unit;

calculation of the average of the Cylinder Lambda values over all the cylinders of said engine (Average Lambda) and supply of the signal therefore;

application of a low-pass filter to the Average Lambda signal (Filtered Average Lambda signal);

application of a low-pass filter to the predetermined sinusoidal target signal of Lambda (Filtered Target Lambda signal);

calculation of the difference between Filtered Average Lambda signal and Filtered Target Lambda signal (Error Lambda) and supply of the signal therefore;

calculation of the known mathematical integral of Error Lambda, multiplied by a value between 0.01 and 1 (Lambda Correction) and supply of the signal therefore;

calculation of the sum of the predetermined sinusoidal target signal of Lambda and Lambda Correction signal (Lambda to Inject signal) and supply of the signal therefore; and determination of the quantity of fuel to put into each cylinder of said engine on the basis of Lambda to Inject signal and supply of the signal therefore to the injectors.

2. A device for determining and putting in a quantity of fuel on the basis of predetermined sinusoidal target signal of the Lambda into an internal combustion engine equipped with a plurality of cylinders, injectors, an ionisation current generating device for each cylinder and a control unit suitable to determine the Lambda value in each cylinder using the ionisation current, wherein said device comprises:

an electronic device for measuring the Lambda values in each cylinder of said engine during a determined interval of time (T) (Cylinder Lambda) and supplying the signal therefore to the control unit;

an electronic device for calculating the average of the Cylinder Lambda values over all the cylinders of said engine (Average Lambda) and supplying the signal therefore;

a low-pass filter applied to the signal supplied by the electronic device for calculating the average (Filtered Average Lambda signal);

a low-pass filter applied to the predetermined sinusoidal target signal of Lambda (Filtered Target Lambda signal);

an electronic device for calculating the difference between Filtered Average Lambda signal and Filtered Target Lambda signal (Error Lambda) and supplying the signal therefore;

an electronic device for calculating the known mathematical integral of Error Lambda multiplied by a value between 0.01 and 1 (Lambda Correction) and supplying the signal therefore;

an electronic device for calculating the sum of predetermined sinusoidal target signal of Lambda and Lambda Correction signal (Lambda to Inject signal) and supplying the signal therefore; and an electronic device for determining the quantity of fuel to put into each cylinder of said engine on the basis of the Lambda to Inject signal furnishing the related signal to the injectors.

* * * * *